United States Patent
Ravi et al.

(10) Patent No.: US 11,144,881 B2
(45) Date of Patent: Oct. 12, 2021

(54) COMPUTER-GENERATED TEAM BASED METRICS FOR CANDIDATE ONBOARDING AND RETENTION

(71) Applicant: International Business Machines Corporation, Armonk, NY (US)

(72) Inventors: Sushil Bhaskar Ravi, Visakhapatnam (IN); Venkata Vara Prasad Karri, Visakhapatnam (IN); Chandra Sekhar Kalyan Devulapalli, Visakhapatnam (IN); Venkata Suresh Babu Golla, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 16/214,235

(22) Filed: Dec. 10, 2018

(65) Prior Publication Data
US 2020/0184424 A1    Jun. 11, 2020

(51) Int. Cl.
G06Q 10/00    (2012.01)
G06Q 10/10    (2012.01)
G06Q 10/06    (2012.01)

(52) U.S. Cl.
CPC ... G06Q 10/1053 (2013.01); G06Q 10/06393 (2013.01); G06Q 10/06398 (2013.01)

(58) Field of Classification Search
CPC ......... G06Q 10/1053; G06Q 10/06393; G06Q 10/06398
See application file for complete search history.

(56) References Cited

U.S. PATENT DOCUMENTS

| | | |
|---|---|---|
| 2010/0131418 A1 | 5/2010 | McCagg et al. |
| 2014/0143165 A1 | 5/2014 | Posse et al. |
| 2015/0269244 A1 | 9/2015 | Qamar et al. |
| 2017/0103368 A1* | 4/2017 | Gupta ................ G06Q 10/1053 |
| 2017/0112427 A1* | 4/2017 | Simon .................. A61B 5/1128 |
| 2018/0082258 A1* | 3/2018 | Mather .............. G06Q 10/1053 |
| 2019/0164133 A1* | 5/2019 | Chakraborty .......... G06N 20/00 |

OTHER PUBLICATIONS

K. Peña, K. Hinsen and M. Wilbur, "Why Diversity Programs Fail—And How to Fix Them," in SMPTE Motion Imaging Journal, vol. 127, No. 9, pp. 56-69, Oct. 2018, doi: 10.5594/JMI.2018.2860499.*
Taylor, Johnny. ("Job 'ghosting' is never a good idea: It's just bad manners, and it's bad for business". USA Today [McLean, Va] Aug. 14, 2018: B.3.).*
Hellmér et al., "A Diversity Approach for Managing Talent in MNCs." Uppsala University, Department of Business Studies, Master Thesis, spring 2014. pp. 62.

* cited by examiner

*Primary Examiner* — Gabrielle A McCormick
(74) *Attorney, Agent, or Firm* — Cantor Colburn LLP; Steven Bouknight

(57) ABSTRACT

Examples of techniques for computer-generated team based metrics for candidate onboarding and retention are described herein. An aspect includes determining metrics of a candidate that is interviewing for a position in a team of an organization. Another aspect includes determine metrics of each individual member of the team. Another aspect includes calculating a first score for the team based on the metrics of each individual member of the team. Another aspect includes recalculating a second score for the team based on the metrics of each individual member of the team and the metrics of the candidate. Another aspect includes determining a variance between the first score and the second score.

17 Claims, 5 Drawing Sheets

COMPUTER-GENERATED TEAM BASED METRICS FOR CANDIDATE ONBOARDING AND RETENTION

BACKGROUND

The present invention relates to computerized techniques for candidate recruitment by an organization. More specifically, the invention relates to use of computer-generated team based metrics for candidate onboarding and retention.

SUMMARY

According to an embodiment described herein, a system can include a processor to determine metrics of a candidate that is interviewing for a position in a team of an organization. The processor can also determine metrics of each individual member of the team. The processor can also calculate a first score for the team based on the metrics of each individual member of the team. The processor can also recalculate a second score for the team based on the metrics of each individual member of the team and the metrics of the candidate. The processor can also determine a variance between the first score and the second score.

According to another embodiment described herein, a method can include determining, via a processor, metrics of a candidate that is interviewing for a position in a team of an organization. The method can also include determining, via the processor, metrics of each individual member of the team. The method can also include calculating, via the processor, a first score for the team based on the metrics of each individual member of the team. The method can also include recalculating, via the processor, a second score for the team based on the metrics of each individual member of the team and the metrics of the candidate. The method can also include determining, via the processor, a variance between the first score and the second score.

According to another embodiment described herein, an apparatus can include a processor to determine metrics of a candidate that is interviewing for a position in a team of an organization. The apparatus can also determine metrics of each individual member of the team. The apparatus can also calculate a first score for the team based on the metrics of each individual member of the team. The apparatus can also recalculate a second score for the team based on the metrics of each individual member of the team and the metrics of the candidate. The apparatus can also determine a variance between the first score and the second score.

DETAILED DESCRIPTION

Figure 1:
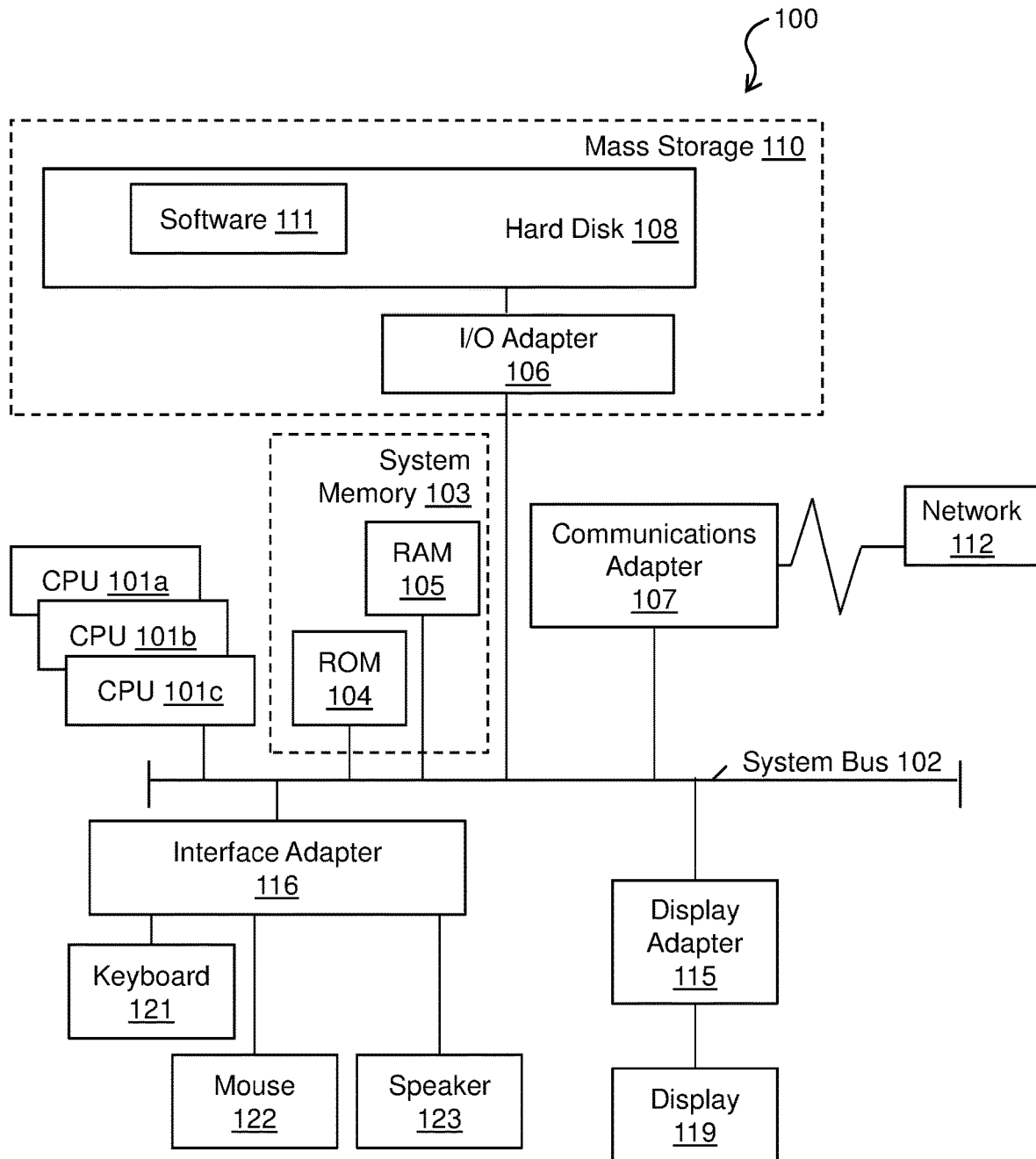
FIG. 1 is a block diagram of an example computer system that may be used in conjunction with computer-generated team based metrics for candidate onboarding and retention.

Embodiments of computer-generated team based metrics for candidate onboarding and retention performed by a processor are provided, with exemplary embodiments being discussed below in detail. Recruitment of talent by an organization may be a time consuming and expensive process. During recruitment, a candidate pool may be identified and narrowed based on candidate interactions in order to select a candidate for onboarding. Agents of the organization, such as a recruiter or hiring manager, may interact with a potential candidate multiple times during the recruitment process via multiple types of communication channels, including but not limited to in person, instant messenger, text, chat, video, telephone, and email conversations. Retention of candidates after onboarding is also a concern. If a candidate decides not to stay with the organization after onboarding, it may be a loss to the organization, as the recruitment process must be restarted to replace the candidate who was not retained.

Computer-generated team based metrics that are generated by the processor may be used to determine a candidate's likelihood of accepting an offered role and being onboarded with an organization, and also to determine the candidate's likelihood of being retained, i.e., staying with the company after onboarding. These determinations may be referred to, respectively, as an onboarding score and a retention score. The onboarding score and the retention score may be determined based on metrics of the team for which the candidate is being considered, and also the candidate's own attributes, including attributes collected by the processor from communication metadata gathered from candidate interactions during the recruitment process. While a recruiter may know the current composition of the team that the candidate is being considered to join, the recruiter may not know how well the candidate will fit into the team after onboarding. The onboarding and retention score, in the context of the presently disclosed invention, may help automatically evaluate how likely the candidate is to join the team, and also how likely the candidate is to stay in the role after joining the team. The onboarding and retention scores may be communicated automatically to the recruiter in order to aid the recruiter in making an educated decision on how to proceed with the candidate, or may be utilized to allow the processor in the presently disclosed invention to automatically generate a decision or suggestion on how to proceed.

Any appropriate attributes of the candidate, including but not limited to diversity attributes such as gender, caste, race, geographic origin, and/or veteran status, may be taken into account when determining by the processor the onboarding score and retention score. The diversity attributes of the current members of the team that the candidate is being considered for may also be determined by the processor and utilized. The diversity score of the team without the candidate, and a recalculated diversity score that assumes that the candidate is hired and included as part of the team, may be automatically determined to calculate a diversity variance for the team including the candidate. The diversity variance may be used to calculate the onboarding score and retention score for the candidate. If the diversity variance for a candidate indicates a favorable change to the diversity of the team, the diversity variance will impact the onboarding probability in the positive, and may also be used as a motivator for the recruiter while communicating to the candidate during the recruitment process.

If the onboarding score and retention score for the candidate on the team for which the candidate is being considered are below a predetermined threshold, the organization may be searched by the processor for a set of other teams having roles that may be a good fit for the candidate. Diversity variances, and associated onboarding and retention scores, may be calculated for each team in the team set that is identified by the search. The candidate may be evaluated for each of the identified teams to determine a team for which the onboarding score and the retention score for the candidate are the most favorable. The identified teams may be ranked based on their onboarding and retention scores for the candidate. Various databases of the organization may be used to determine the other teams that are appropriate for a candidate, as well as to determine the diversity scores of the teams in the team set. In some embodiments, a diversity variance may be calculated for a candidate at different levels of the organization such as team, business unit, and/or geographic location, in order to determine the candidate's effect on the diversity of the organization at multiple levels.

Candidate interaction metrics may also be used to determine the onboarding score and the retention score. Communication metadata may be gathered from the various interactions with the candidate, and the communication metadata may be analyzed by the processor to determine the candidate interaction metrics. Trends in the candidate interaction metrics may be identified and used to determine a candidate commitment score in some embodiments. The candidate commitment score may be used to determine the onboarding score for the candidate. The recruiter may also be notified as to changes in the candidate commitment score during the recruitment process. A recruiter may be automatically notified when a candidate's commitment score drops below a predetermined commitment threshold. The recruiter may be notified that corrective actions may be necessary to cause the candidate to be reengaged. The notification may be automatically provided to the recruiter in any appropriate manner, including but not limited to an email, telephone call, text, or any other messaging system. In some embodiments, the notification may include links to historical analysis of similar situations involving other candidates, and may also recommend particular corrective actions that have been used in the past with other candidates to achieve a higher level of engagement. Information regarding various corrective actions taken to address similar cases of engagement level drop may also be provided. Any variance in candidate sentiment, as indicated by the candidate's commitment score, may be used as an indicator to suggest corrective actions that need to be taken to maintain or improve candidate's sentiments regarding the organization and the recruitment process by the recruiter.

In some embodiments, the temperament of the candidate may be quantified based on the communication metadata and used to determine the retention score for the candidate through the use of natural language processing in tandem with historical communications data analysis. The natural language processing may be applied to any candidate communications in order to quantify the temperament of the candidate. In some embodiments, the analysis of the candidate communications that is performed to quantify the temperament of the candidate may be performed using a natural language processing software such as Watson Speech to Text™, Sentiment Analysis™, and/or Tone Analyzer™. The temperament metrics may also be used to determine the engagement levels of the various candidates in a candidate set, as well as to identify candidates that are compatible with the values of the job, division, and/or the company.

The communication metadata may be stored in a communication database. The communication database may contain metadata for any communications that have taken place between a candidate and any the systems and people belonging to the company that the candidate has communicated with (e.g., through voice, video, chat, email, or in person). The communication database may be synced to a server system that is configured to receive data from multiple communication channels or sources. Upon completion of each communication event with the candidate, information regarding the communication event information is gathered and stored in the communication database. This information may be analyzed to quantify the candidate's emotional state and personality via, for example, identification of key recurring phrases or words. For example, recurring positive and negative words may be identified throughout the communication to determine a result set. This result set may be used throughout the recruitment process as a dynamic feedback system that may recommend corrective measures to the recruiter.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
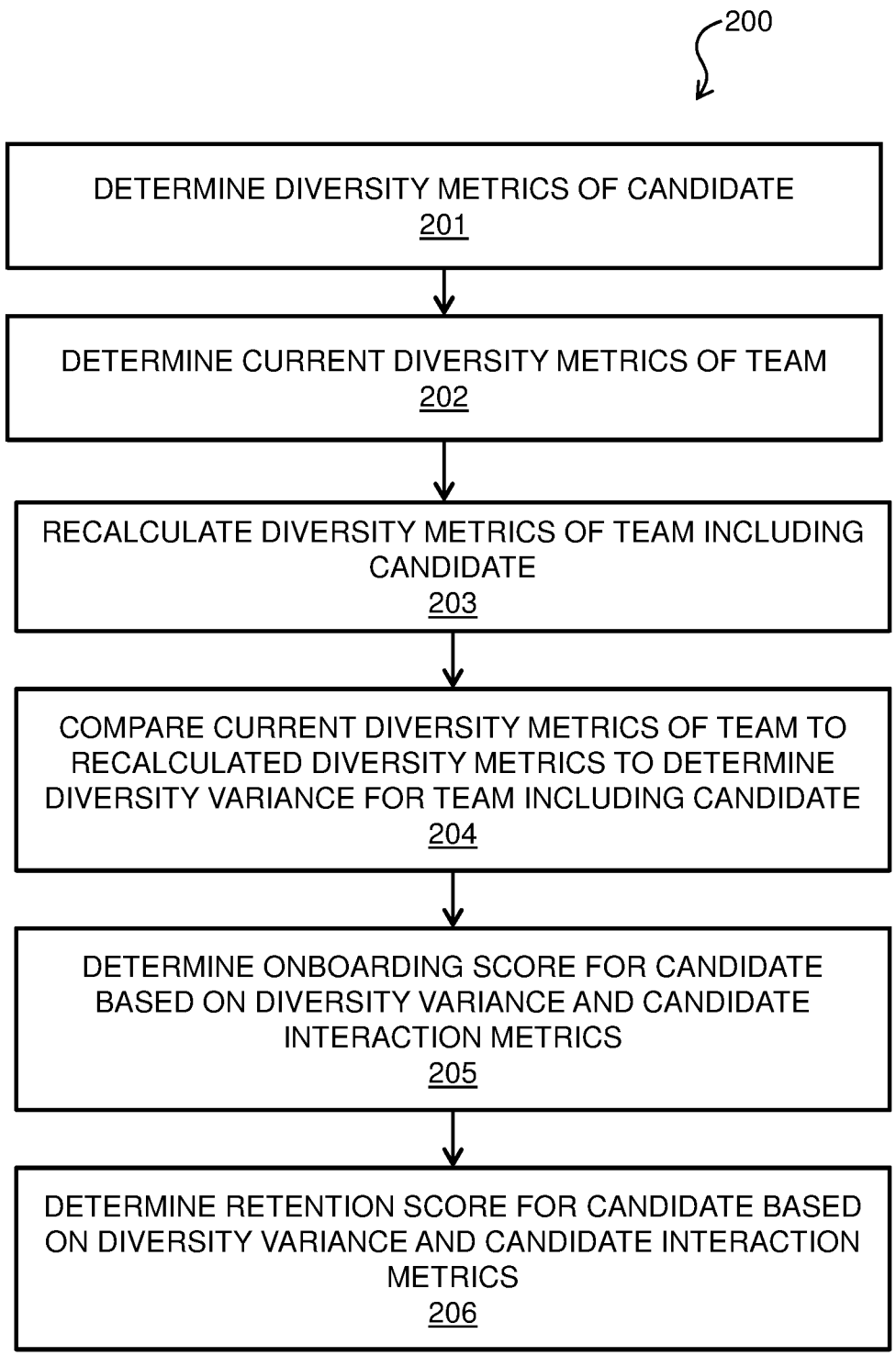
FIG. 2 is a process flow diagram of an example method for calculation of an onboarding score and a retention score for computer-generated team based metrics for candidate onboarding and retention.

FIG. 2 is a process flow diagram of an example method for calculation of an onboarding score and a retention score for computer-generated team based metrics for candidate onboarding and retention. The method 200 can be implemented with any suitable computing device, such as the computer system 100 of FIG. 1, using, for example, processor 101. In block 201 of method 200, diversity metrics are determined by a processor of a computing device for a candidate who is interviewing for a role in an organization. The diversity metrics may be automatically determined by the processor based on any appropriate attributes of the candidate, including but not limited to gender, caste, race, geographic origin, and/or veteran status. In some embodiments, a set of diversity metrics to be analyzed may be determined, and a score for each of the diversity metrics in the set may be determined for the candidate. In other embodiments, a candidate may be assigned a point for each of the set of diversity metrics that applies to the candidate (for example, a lower-caste person who is a veteran may receive a point each, or two points total, for those attributes) to determine a single diversity score for the candidate. In some embodiments, a first diversity metric of the set of diversity metrics may be given a higher weight than a second diversity metric of the set of diversity metrics when determining the candidate's diversity score.

In block 202, the current diversity metrics across the individual members of the team for which the candidate is interviewing are determined by the processor of the computing device. The current diversity metrics of the team may be automatically determined by the processor based on any appropriate attributes of the individual members that are currently on the team, including but not limited to such as gender, caste, race, geographic origin, and/or veteran status. For example, a set of diversity metrics to be analyzed may be determined, and a score for each of the diversity metrics in the set may be determined for each individual member of the team. In other embodiments, each member of the team may receive a point for each of the diversity metrics that apply to the team member to determine a single diversity score for the team member. The scores for each individual member of the team may be combined in any appropriate manner to determine the overall team diversity score. For example, in some embodiments, a first diversity metric of the set of diversity metrics may be given a higher weight than a second diversity metric of the set of diversity metrics when combining the scores. The team that the candidate is being interviewed for may be considered for determining the diversity levels and how the current candidate can change the diversity level of the team. If there is a significant diversity level increase due to the addition of the candidate, this may be automatically communicated to the recruiter via a notification. For example, the recruiter may receive a telephone call, text, email, etc. regarding the candidate, urging the recruiter to focus on the candidate during the recruitment process. Comparing the diversity level of the team with the diversity levels of other teams that may have higher diversity levels, and the team's success rate may be analyzed for presentation and recommendation to the recruiter. This diversity level combined with the overall score of the candidate's abilities can contribute to the onboarding score and how well the candidate can bring a mixture of abilities into the company.

In block 203, the diversity metrics of the team are recalculated by the processor of the computing device to include the diversity metrics of the candidate. In block 204, the current diversity metrics of the team that were determined in block 202 are compared to the recalculated diversity metrics that were determined in block 203 to determine a diversity variance for the candidate, i.e., a change in the diversity metrics of the team attributable to the candidate. In some embodiments of method 200 of FIG. 2, a diversity variance may be calculated for a candidate at various levels of the organization such as team, business unit, and/or geographic location, in order to further determine the candidate's effect on the diversity of the organization at various levels. In block 205, an onboarding score is determined for the candidate based on the diversity variance and candidate interaction metrics. If the diversity variance for a candidate indicates a favorable change to the diversity of the team, the diversity variance will impact the onboarding probability in the positive, and may also be used as a motivator by the recruiter while communicating to the candidate. The candidate interaction metrics that are used to calculate the onboarding score may include candidate sentiment data regarding the organization and the recruitment process and are discussed in further detail with respect to FIG. 3. In block 206, a retention score is also determined by the processor of the computing device for the candidate based on the diversity variance and candidate interaction metrics. The retention score quantifies a likelihood that the candidate will stay in the role after onboarding, and may be determined based on candidate temperament data that is derived from the candidate interaction metrics, which are discussed in further detail below with respect to FIG. 3. In some embodiments, historical trends regarding retention of diverse new hires on the particular team may be taking into account in the retention score. For example, new hires having certain characteristics may have historically not stayed with the time. In such an example, the candidate may be a better fit with a different team. An onboarding score and a retention score that are calculated by method 200 of FIG. 2 may be determined for each candidate in a candidate set and provided to a recruiter to aid the recruiter in selecting a candidate that may be a good fit for the role.

In some embodiments of method 200 of FIG. 2, it may be determined whether the onboarding score and retention score that were determined in blocks 205 and 206 for the candidate for the team for which the candidate is interviewing are below a threshold. If it is determined that the onboarding score and the retention score for the candidate for the team for which the candidate is interviewing are below the threshold, indicating that the candidate may not be a good fit for the team, other teams in the organization may be searched for roles that are appropriate for the candidate. Diversity variances, and associated onboarding and retention scores, may be calculated for the candidate for each team that is identified by the search as described above with respect to FIG. 2. The candidate may be compared with each of the job openings to determine a team of the identified teams for which the diversity and onboarding score are the most favorable. The identified teams may be ranked based on their respective onboarding and retention scores for the candidate. This is discussed below in further detail with respect to FIG. 4.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
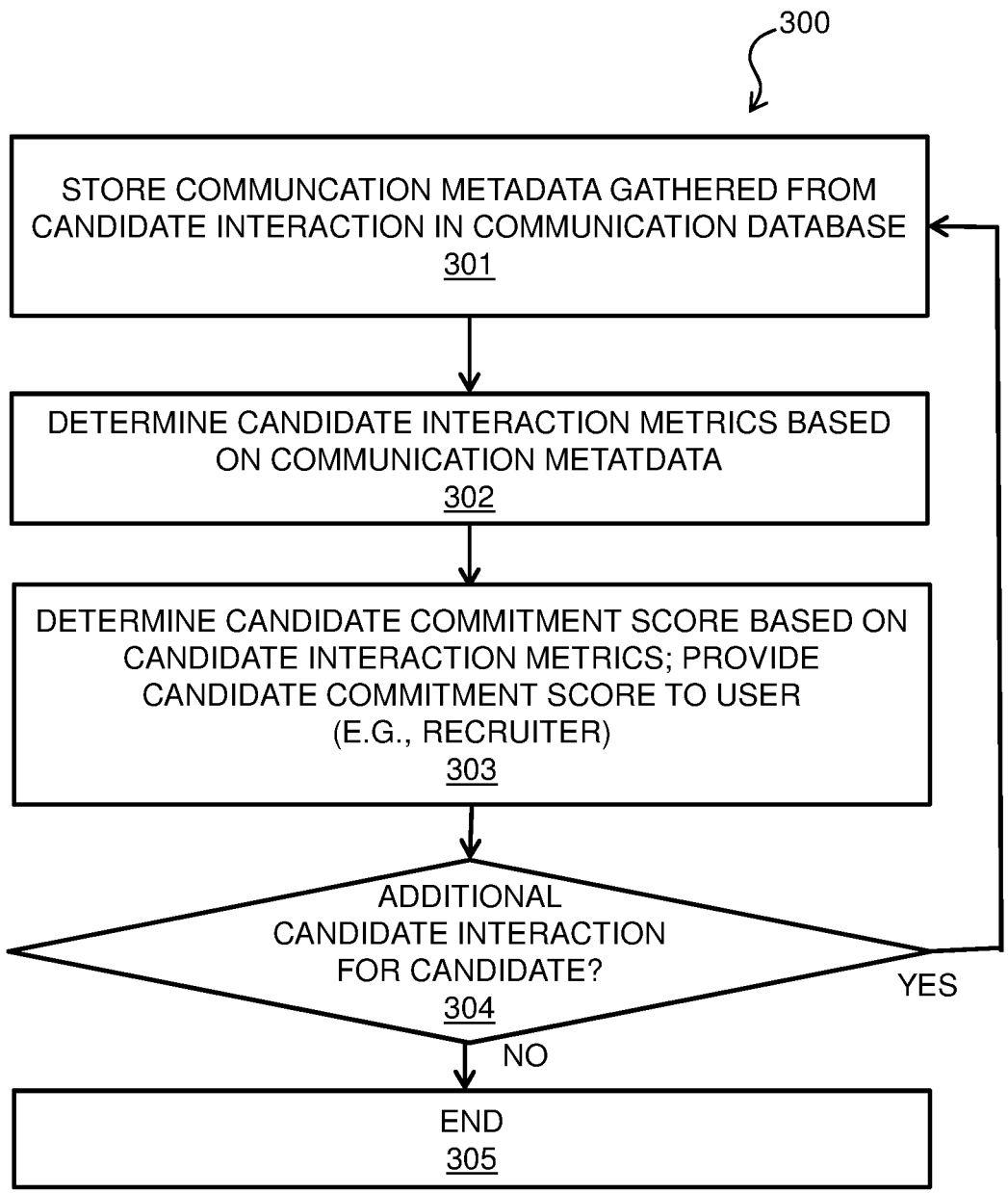
FIG. 3 is a process flow diagram of an example method for gathering and processing of communication metadata for computer-generated team based metrics for candidate onboarding and retention.

FIG. 3 is a process flow diagram of an example method for gathering and processing of communication metadata for computer-generated team based metrics for candidate onboarding and retention. The method 300 can be implemented with any suitable computing device, such as the computer system 100 of FIG. 1, using, for example, the processor 101. Method 300 may be used to determine the candidate interaction metrics that are used in blocks 205 and 206 of FIG. 2. In block 301, communication metadata is gathered for a particular candidate interaction, and stored in a communication database. The communication database may be any appropriate type of computer storage that is in communication with the computing device. The communication metadata may be gathered in any appropriate manner, from any type of candidate interaction, including but not limited to in person, instant messenger, text, chat, video, telephone, and email conversations. The communication metadata may be gathered by, for example, analyzing the electronically recorded contents of a candidate interaction (e.g., identifying recurring words or phrases in the audio of a telephone or video call), and/or based on feedback that may be requested from the candidate or the interviewer after the candidate interaction. The feedback may be received in any appropriate manner; in some embodiments, the feedback may be an automated survey that may be performed, for example, via telephone or via a web browser. In block 302, candidate interaction metrics are determined based on the communication metadata. The candidate interaction metrics may include, in various embodiments, candidate sentiment data regarding the candidate's feelings regarding the recruitment process and the organization, and candidate temperament data regarding the candidate's personality. In some embodiments, the analysis of the candidate communications may be performed using a natural language processing software such as Watson Speech to Text™, Sentiment Analysis™, and/or Tone Analyzer™. The candidate sentiment data may be used to determine the candidate onboarding score in block 205 of FIG. 2. The candidate temperament data may be used to determine the candidate retention score in block 206 of FIG. 2. Identification of recurring phrases or words in the communication metadata may be used to determine the candidate sentiment data and candidate temperament data. For example, recurring positive and negative words that are used by the candidate may be identified throughout a candidate communication (e.g., the audio of a telephone or video call) to determine a result set of words that indicate a particular candidate sentiment. The result set may be identified by parsing the candidate communication metadata into a Watson system such as Sentiment Analysis and/or Tone Analyzer in some embodiments. This result set may be used throughout the recruitment process as a dynamic feedback system that may recommend corrective measures to the recruiter. Temperament metrics may also be calculated based on the candidate interaction metrics to determine the engagement levels of the various candidates in a candidate set, as well as in the candidate temperament data to identify candidates that may be compatible with the values of the job, division, and/or the company.

In block 303, a candidate commitment score is determined based on the candidate interaction metrics. The candidate commitment score may be determined based on the candidate sentiment data, and indicate the candidate's likelihood of accepting an offered position at the end of the recruitment process. The candidate commitment score may be communicated to a user, e.g., a recruiter or a hiring manager, in block 303, in any appropriate manner. Trends in the candidate communication may be identified and analyzed, and used to determine the candidate commitment score in some embodiments. The recruiter may also be notified as to changes in the candidate commitment score during the recruitment process. For example, a recruiter may be notified when a candidate's commitment score changes beyond a defined threshold. The variance in candidate sentiment may be used as an indicator to suggest corrective actions that need to be taken to maintain or improve candidate's sentiments by the recruiter. In block 304, it is determined whether there is an additional candidate interaction for the candidate. If there is an additional candidate interaction for the candidate, flow proceeds from block 304 to block 301, and the candidate interaction metrics are updated for the candidate based on the additional interaction as described above with respect to blocks 301-303. If it is determined in block 304 that there is not an additional candidate interaction for the candidate, flow proceeds to block 305, and method 300 ends.

The communication metadata that is collected according to method 300 of FIG. 3 may also be used to perform historical analysis of candidate sentiments across a subset of interactions, or for the entire recruitment process, for a particular person associated with the organization (e.g., interviewer or recruiter), or for a domain, geography, business unit, skillset, or experience, in some embodiments. A recruiter may improve a candidate's onboarding score by presenting similar historical trends in the candidate experience.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
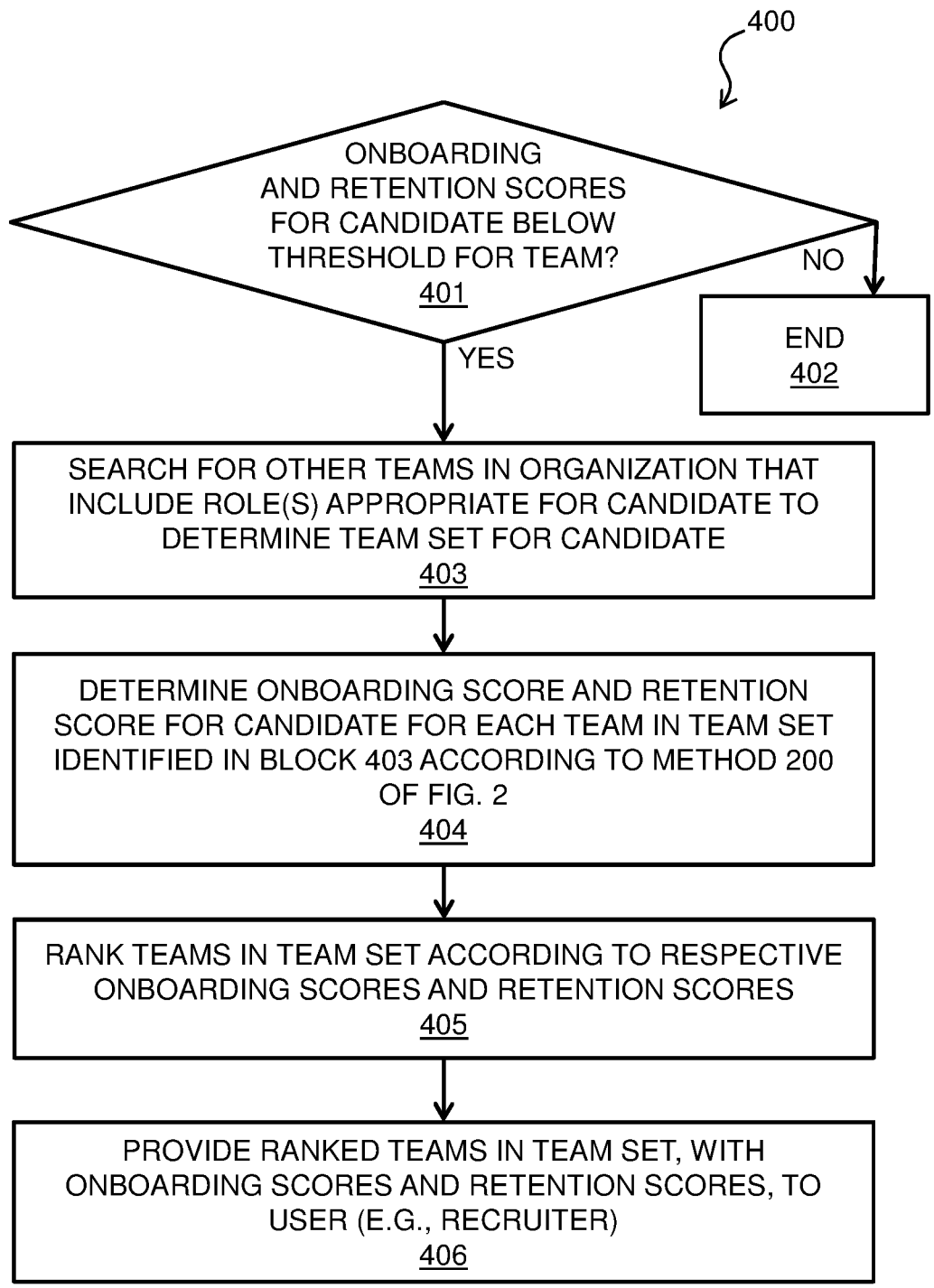
FIG. 4 is a process flow diagram of an example method for team set ranking for computer-generated team based metrics for candidate onboarding and retention.

FIG. 4 is a process flow diagram of an example method for team set ranking for computer-generated team based metrics for candidate onboarding and retention. The method 400 can be implemented with any suitable computing device, such as the computer system 100 of FIG. 1, using, for example, processor 101. In block 401, it is determined whether the onboarding score and retention score for the candidate with respect to the team for which the candidate is being considered (which may be calculated according to method 200 of FIG. 2) are below a predetermined threshold. If it is determined that the onboarding score and retention score for the candidate with respect to the team for which the candidate is being considered are not below the predetermined threshold in block 401, flow proceeds from block 401 to block 402, and method 400 ends.

If it is determined in block 401 that the onboarding score and retention score for the candidate with respect to the team for which the candidate is being considered are below the predetermined threshold, flow proceeds from block 401 to block 403. In block 403, other teams in the organization are searched for any roles that might be appropriate for the candidate in order to determine a team set for the candidate. Any team that includes a role that is appropriate for the candidate may be added to the team set in block 403. Various databases of the organization may be searched in order to determine teams that should be added to the team set in block 403. In block 404, a separate onboarding score and retention score are determined for the candidate with respect to each team in the team set. The onboarding score and retention score for each team in the team set may each be determined according to method 200 of FIG. 2. In block 405, the teams in the team set are ranked according to their respective onboarding score and retention score that were calculated in block 404. In block 406, the ranked teams in the team set may be provided to a user (e.g., a recruiter or a hiring manager). It may be recommended that the candidate be considered for a different team from the team that the candidate is interviewing for based on the ranked team set.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
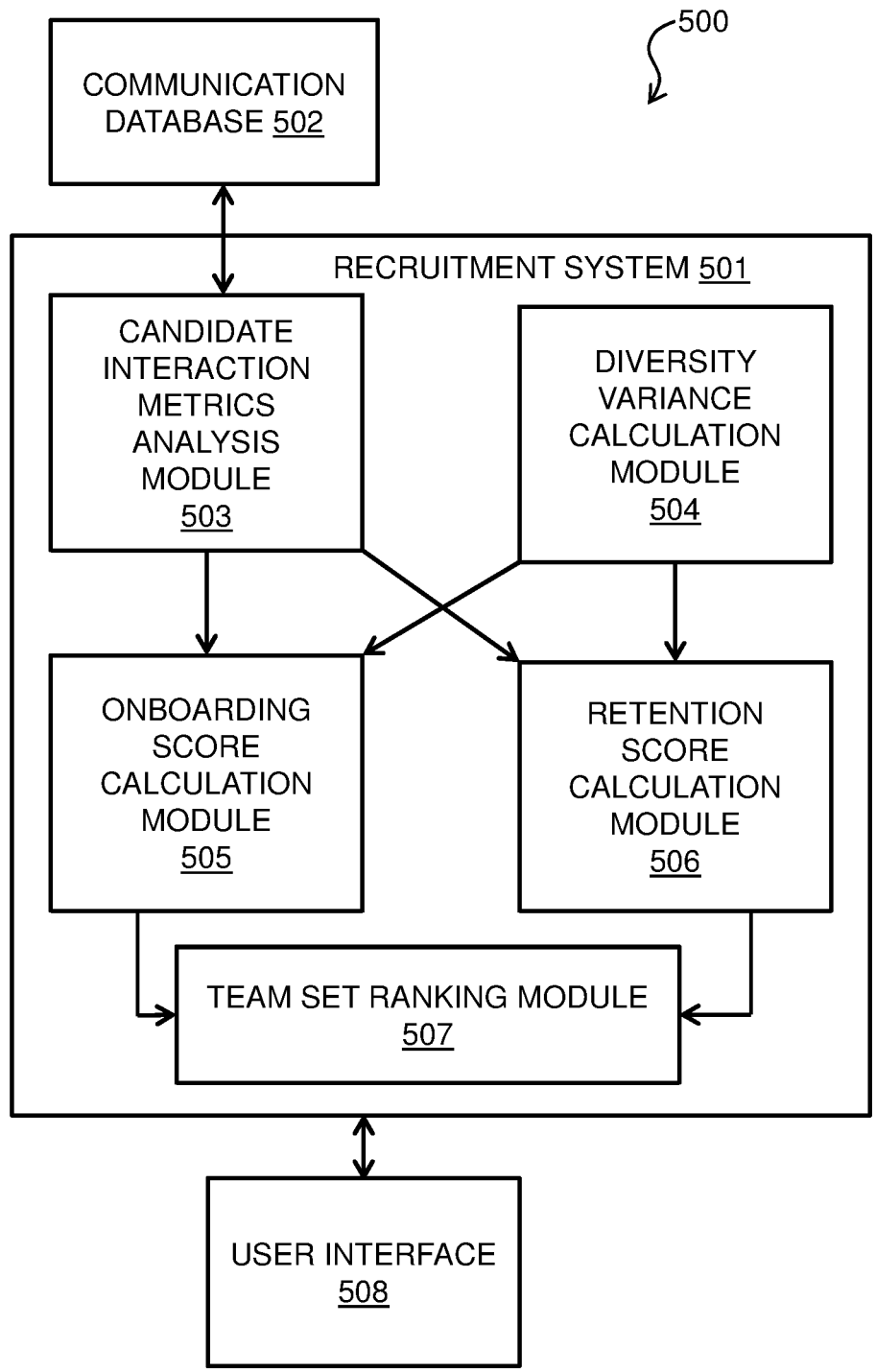
FIG. 5 is a block diagram of an example system for computer-generated team based metrics for candidate onboarding and retention.

FIG. 5 is a block diagram of an example system 500 for computer-generated team based metrics for candidate onboarding and retention. System 500 may be implemented using a computer system such as computer system 100 of FIG. 1. System 500 includes a recruitment system 501. The recruitment system 501 is in communication with a communication database 502, which stores communication metadata as discussed above with respect to method 300 of FIG. 3. The communication database 502 may contain metadata for any candidate interactions with any systems or people belonging to the organization. The candidate interaction may have taken place through any appropriate communication medium (e.g., through voice, video, chat, email, or in person). The communication database 502 may be synced to a server system that is configured to receive data from multiple communication channels or sources in some embodiments. In some embodiments, feedback may be collected from the candidate and/or from the recruiter after a candidate interaction. Upon completion of each candidate interaction, information regarding the candidate interaction is gathered and stored in the communication database 502. The communications data in the communications database 502 is analyzed by the candidate interaction metrics analysis module 503 as described above with respect to method 300 of FIG. 3. In some embodiments, the candidate interaction metrics analysis module 503 may include a natural language processing software such as Watson Speech to Text™, Sentiment Analysis™, and/or Tone Analyzer™.

The recruitment system 501 further includes a candidate interaction metrics analysis module, which may implement method 300 of FIG. 3 in conjunction with the communication database 502 to determine the candidate commitment score, and the candidate interaction metrics. The recruitment system 501 also includes a diversity variance calculation module 504, which may calculate the diversity metrics and diversity variance as discussed above with respect to FIG. 2. The recruitment system 501 also includes an onboarding score calculation module 505, which may calculate the onboarding score for a candidate as discussed above with respect to FIG. 2. The onboarding score calculation module 505 calculates the onboarding score based on input from the candidate interaction metrics analysis module 503 and the diversity variance calculation module 504. The onboarding score calculation module 505 may also calculate onboarding scores for each team in a team set that includes a number of teams that were identified as having roles appropriate for the candidate according to FIG. 4.

The recruitment system 501 may further include a retention score calculation module 506, which may calculate the retention score for a candidate as discussed above with respect to FIG. 2. The retention score calculation module 506 calculates the retention score based on input from the candidate interaction metrics analysis module 503 and the diversity variance calculation module 504. The retention score calculation module 506 may also calculate retention scores for each team in a team set that includes a number of teams that were identified as having roles appropriate for the candidate according to FIG. 4. Team set ranking module 507 may determine other teams that have roles that may be a good fit for a candidate, as described with respect to FIG. 4. The team set ranking module 507 may communicate with onboarding score calculation module 505 and retention score calculation module 506 in order to obtain onboarding scores and retention scores for each team in a team set in order to rank the teams in the team set. The recruitment system 501 may communicate with a user (e.g., a recruiter or hiring manager) via a user interface 508. Various candidate metrics may be communicated to a user via user interface 508, including but not limited to an onboarding score that is calculated in block 205 of FIG. 2; a retention score that is calculated in block 206 of FIG. 2; a candidate commitment score that is calculated in block 303 of FIG. 3; and a ranked team set that is determined in block 406 of FIG. 4.

It is to be understood that the block diagram of FIG. 5 is not intended to indicate that the system 500 is to include all of the components shown in FIG. 5. Rather, the system 500 can include any appropriate fewer or additional components not illustrated in FIG. 5 (e.g., computer systems, modules, databases etc.). Further, the embodiments described herein with respect to system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
determine diversity metrics of a candidate that is interviewing for a position in a team of an organization;
determine diversity metrics of each individual member of the team;
calculate a first diversity score for the team based on the diversity metrics of each individual member of the team;
calculate a second diversity score for the team based on the diversity metrics of each individual member of the team and the diversity metrics of the candidate;
determine a diversity variance comprising a difference between the first diversity score and the second diversity score;
determine candidate interaction metrics for the candidate based on natural language processing of communication data corresponding to the candidate that is stored in a communication database, wherein determining the candidate interaction metrics comprises:
receiving an audio recording of a first candidate interaction;
performing natural language processing of the audio recording of the first candidate interaction;
identifying a result set comprising recurring positive words and recurring negative words in the first candidate interaction based on the natural language processing; and
determining the candidate interaction metrics based on the result set; and
recommend a corrective action to a recruiter based on the diversity variance and the candidate interaction metrics.

2. The system of claim 1, wherein the diversity metrics comprise: gender, caste, race, geographic origin, and veteran status; and
wherein determining the diversity metrics of the candidate comprises awarding the candidate a point for each diversity metric that corresponds to the candidate.

3. The system of claim 1, the processor configured to: determine that an onboarding score does not meet a predetermined threshold; and based on determining that the onboarding score does not meet the predetermined threshold: determine a team set comprising a plurality of teams of the organization that include a role that is appropriate for the candidate; for each team of the plurality of teams in the team set, calculate an onboarding score; rank the plurality of teams in the team set based on each team's respective onboarding score; and recommend that the candidate be considered for a top-ranked team of the ranked plurality of teams.

4. The system of claim 1, wherein the communication data corresponding to the candidate comprises audio from a telephone call or video call with the candidate.

5. The system of claim 1, the processor configured to:
determine a candidate commitment score based on the identified recurring positive words and recurring negative words in the communication data corresponding to the candidate;
determine that the candidate commitment score does not meet a predetermined commitment threshold; and based on determining that the candidate commitment score does not meet the predetermined commitment threshold, recommend a corrective action to the recruiter.

6. The system of claim 5, wherein recommending the corrective action to the recruiter comprises providing a historical analysis of recruitment of a previous candidate to the recruiter.

7. A computer-implemented method, comprising:
determining, via a processor, metrics of a candidate that is interviewing for a position in a team of an organization;
determining, via a processor, diversity metrics of a candidate that is interviewing for a position in a team of an organization;
determining, via the processor, diversity metrics of each individual member of the team;
calculating, via the processor, a first diversity score for the team based on the diversity metrics of each individual member of the team;
calculating, via the processor, a second diversity score for the team based on the diversity metrics of each individual member of the team and the diversity metrics of the candidate;
determining, via the processor a diversity variance comprising a difference between the first diversity score and the second diversity score;
determining, via the processor, candidate interaction metrics for the candidate based on natural language processing of communication data corresponding to the candidate that is stored in a communication database, wherein determining the candidate interaction metrics comprises:
receiving an audio recording of a first candidate interaction;
performing natural language processing of the audio recording of the first candidate interaction;
identifying a result set comprising recurring positive words and recurring negative words in the first candidate interaction based on the natural language processing; and
determining the candidate interaction metrics based on the result set; and
recommend a corrective action to a recruiter based on the diversity variance and the candidate interaction metrics.

8. The computer-implemented method of claim 7, wherein the diversity metrics comprise: gender, caste, race, geographic origin, and veteran status; and
wherein determining the diversity metrics of the candidate comprises awarding the candidate a point for each diversity metric that corresponds to the candidate.

9. The computer-implemented method of claim 7, the method comprising: determining that an onboarding score does not meet a predetermined threshold; and based on determining that the onboarding score does not meet the predetermined threshold: determining a team set comprising a plurality of teams of the organization that include a role that is appropriate for the candidate; for each team of the plurality of teams in the team set, calculating an onboarding score; ranking the plurality of teams in the team set based on each team's respective onboarding score; and recommending that the candidate be considered for a top-ranked team of the ranked plurality of teams.

10. The method of claim 7, wherein the communication data corresponding to the candidate comprises audio from a telephone call or video call with the candidate.

11. The method of claim 7, the method comprising:
determining a candidate commitment score based on the identified recurring positive words and recurring negative words in the communication data corresponding to the candidate;
determining that the candidate commitment score does not meet a predetermined commitment threshold; and
based on determining that the candidate commitment score does not meet the predetermined commitment threshold, recommending a corrective action to the recruiter.

12. The method of claim 11, wherein recommending the corrective action to the recruiter comprises providing a historical analysis of recruitment of a previous candidate to the recruiter.

13. A computer program product comprising a computer readable storage medium having program instructions embodied therewith, the program instructions executable by one or more processors to cause the one or more processors to perform operations comprising:
determining diversity metrics of a candidate that is interviewing for a position in a team of an organization;
determining diversity metrics of each individual member of the team;
calculating a first diversity score for the team based on the diversity metrics of each individual member of the team;
calculating a second diversity score for the team based on the diversity metrics of each individual member of the team and the diversity metrics of the candidate;
determining a diversity variance comprising a difference between the first diversity score and the second diversity score;
determining candidate interaction metrics for the candidate based on natural language processing of communication data corresponding to the candidate that is stored in a communication database, wherein determining the candidate interaction metrics comprises:
receiving an audio recording of a first candidate interaction;
performing natural language processing of the audio recording of the first candidate interaction;
identifying a result set comprising recurring positive words and recurring negative words in the first candidate interaction based on the natural language processing; and
determining the candidate interaction metrics based on the result set; and
recommend a corrective action to a recruiter based on the diversity variance and the candidate interaction metrics.

14. The computer program product of claim 13, wherein the diversity metrics comprise: gender, caste, race, geographic origin, and veteran status; and
wherein determining the diversity metrics of the candidate comprises awarding the candidate a point for each diversity metric that corresponds to the candidate.

15. The computer program product of claim 13, wherein the operations further comprise: determining that an onboarding score does not meet a predetermined threshold; and based on determining that the onboarding score does not meet the predetermined threshold: determining a team set comprising a plurality of teams of the organization that include a role that is appropriate for the candidate; for each team of the plurality of teams in the team set, calculating an onboarding score; ranking the plurality of teams in the team set based on each team's respective onboarding score; and recommending that the candidate be considered for a top-ranked team of the ranked plurality of teams.

16. The computer program product of claim 13, wherein the communication data corresponding to the candidate comprises audio from a telephone call or video call with the candidate.

17. The computer program product of claim 13, wherein the operations further comprise:
   determining a candidate commitment score based on the identified recurring positive words and recurring negative words in the communication data corresponding to the candidate;
   determining that the candidate commitment score does not meet a predetermined commitment threshold; and
   based on determining that the candidate commitment score does not meet the predetermined commitment threshold, recommending a corrective action to the recruiter.

* * * * *